United States Patent
Amsallen et al.

Patent Number: 6,052,637
Date of Patent: Apr. 18, 2000

[54] CLUTCH ADJUSTMENT DETERMINATION

[75] Inventors: Marcel Amsallen, Portage; Timothy J. Morscheck, Kalamazoo, both of Mich.

[73] Assignee: Eaton Corporation, Cleveland, Ohio

[21] Appl. No.: 08/871,727

[22] Filed: Jun. 9, 1997

[51] Int. Cl.$^7$ ................................................ B60K 41/08
[52] U.S. Cl. ............................ 701/51; 701/55; 701/58; 701/53; 477/123; 477/50; 477/152
[58] Field of Search .................... 701/51, 55, 58, 701/53; 477/123, 50, 152

[56] References Cited

U.S. PATENT DOCUMENTS

| | | | |
|---|---|---|---|
| 4,850,236 | 7/1989 | Braun | 74/337 |
| 5,105,357 | 4/1992 | Steeby | 364/424.1 |
| 5,157,607 | 10/1992 | Stainton et al. | 701/51 |
| 5,389,053 | 2/1995 | Steeby et al. | 477/123 |
| 5,416,698 | 5/1995 | Hutchinson | 701/51 |
| 5,435,212 | 7/1995 | Menig | 74/745 |
| 5,456,344 | 10/1995 | Nellums | 192/13 |
| 5,569,115 | 10/1996 | Desaultes et al. | 477/110 |
| 5,682,790 | 11/1997 | Genise | 477/123 |
| 5,809,441 | 9/1998 | McKee | 701/51 |
| 5,938,712 | 8/1999 | Ibamoto et al. | 701/54 |

*Primary Examiner*—William A. Cuchlinski, Jr.
*Assistant Examiner*—Olga Hernandez
*Attorney, Agent, or Firm*—Howard D. Gordon

[57] ABSTRACT

A control for determining the state of adjustment or misadjustment of a master friction clutch (14) in a vehicular automated mechanical transmission system (10). A system controller (24) receives input signals (26) indicative of the engaged or disengaged condition of the master clutch, the rotational speed of the transmission input shaft (IS) and the engaged or disengaged condition of the mechanical transmission (16). When the master clutch and the transmission both are disengaged, the rate of change of input shaft speed (dIS/dt) is compared to a predetermined reference value, and if the rate of deceleration of the input shaft speed is less than said reference value, significant master clutch misadjustment is determined and corrective action is initiated. Corrective action may include causing a display (48) to signal the operator that the master clutch is improperly adjusted and/or operating an input shaft brake (50) in a fault-tolerant mode.

21 Claims, 4 Drawing Sheets

CLUTCH ADJUSTMENT DETERMINATION

BACKGROUND OF THE INVENTION

1. Field of the Invention

The present invention relates to a control method/system for sensing conditions indicative of a misadjusted master clutch in a fully or partially automated mechanical transmission system. Upon sensing the presence of such conditions, the vehicle operator will be notified, a maintenance request will be established and/or the vehicle drive line system will be operated in a fault-tolerant manner.

2. Description of the Prior Art

Semi-automatic and fully automatic mechanical transmission systems are well known in the prior art, as may be seen by reference to U.S. Pat. Nos. 4,361,060; 4,593,580; 4,648,290; 4,722,248; 5,038,627; 5,053,961; 5,105,357; 5,272,939; 5,337,868; 5,435,212; 5,439,428; 5,508,290; 5,509,867 and 5,569,115, the disclosures of which are incorporated herein by reference. Such systems often incorporated control logic for fault-sensing and/or fault-tolerant operation, as may be seen by reference to U.S. Pat. Nos. 4,849,899 and 4,899,279, the disclosures of which are incorporated herein by reference.

The prior art systems, as disclosed, were not totally satisfactory, as they did not incorporate means or a method for determining that the vehicle master clutch was misadjusted to an extent that did or threatened to degrade vehicle operation. By way of example, a significantly misadjusted master clutch, even in the disengaged condition, may cause sufficient drag on the transmission input shaft to render disengaging and engaging gears, especially the start-from-stop gears, difficult or impossible. Further, a significantly misadjusted master clutch may interfer with the operation of or damage an input shaft brake.

SUMMARY OF THE INVENTION

In accordance with the present invention, a control system/method is provided for sensing conditions deemed indicative of significant master clutch misadjustment in an automated mechanical transmission system. Upon sensing such conditions, the vehicle operator will be warned, a "maintenance required" record will be created and/or a clutch misadjustment tolerant mode of operation will be implemented.

The foregoing is accomplished in an automated mechanical transmission system incorporating a preferred embodiment of the present invention by sensing master clutch disengagement, transmission disengagement or neutral, and then sensing the deceleration of the transmission input shaft. If the deceleration of the transmission input shaft is less than a reference value (dIS/dt>REF), then a misadjustment condition is declared and corrective action is taken.

Accordingly, it is an object of the present invention to provide a new and improved vehicular automated transmission system having a control for sensing significant master clutch misadjustment and for taking corrective action in response thereto.

This and other objects and advantages of the present invention will become apparent from a reading of the following description of the preferred embodiment taken in connection with the attached drawings.

DESCRIPTION OF THE PREFERRED EMBODIMENT

Figure 1:
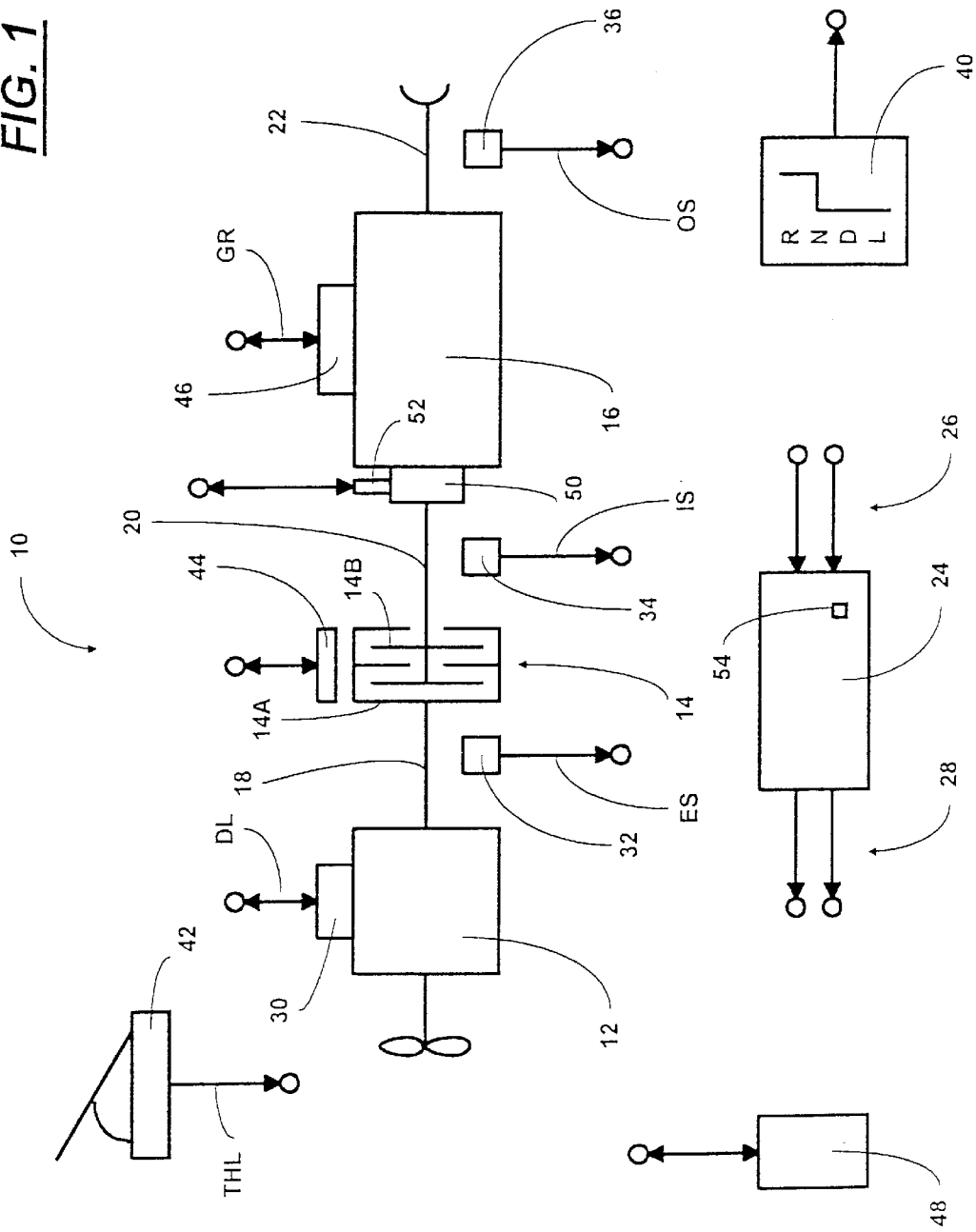
FIG. 1 is a schematic illustration, in block diagram format, of an automated vehicular transmission system utilizing the control of the present invention.

A vehicular automated mechanical transmission system 10 of the type advantageously utilizing the control method/system of the present invention is schematically illustrated in FIG. 1. The automated mechanical transmission system includes a fuel-controlled engine 12, such as a well-known diesel engine or the like, a master friction clutch 14 of the type described in U.S. Pat. No. 4,081,065, the disclosure of which is incorporated herein by reference, and a multiple-speed, change-gear mechanical transmission 16, which will be described in greater detail below The engine includes a crankshaft 18 drivingly connected to the input members 14A of master clutch 14, which are selectively frictionally engaged with the output members 14B for driving the input shaft 20 of the transmission. The transmission includes an output shaft 22 which is drivingly associated with the vehicle drive wheels, as is well known in the prior art, whereby the rotational speed of the output shaft (OS) is indicative of vehicle speed. Fully and partially automated mechanical transmission systems of this general type are known in the prior art, as may be seen by reference to aforementioned U.S. Pat. Nos. 4,361,060; 4,648,290; 5,272,939; 5,337,868 and 5,569,115.

System 10 will also include a control unit 24, preferably a microprocessor-based control unit of the type illustrated in U.S. Pat. Nos. 4,595,986 and 5,335,566, the disclosures of which are incorporated herein by reference, for receiving input signals 26 and processing same according to predetermined logic rules to issue command output signals 28 to various system actuators and the like. A separate system controller 24 may be utilized, or the engine controller 30 associated with an electronically controlled engine and communicating over an electronic data link, such as a data link conforming to SAE J-1939, may be utilized. The control unit 24 will receive input signals from various sensors including a sensor 32 for providing a signal (ES) indicative of engine rotational speed, a sensor 34 for providing a signal (IS) indicative of transmission input shaft rotational speed, a sensor 36 for providing a signal indicative of output shaft rotational speed, a sensor 40 associated with the driver control console, and a sensor 42 for providing a signal (THL) indicative of the operator's displacement of the vehicle throttle pedal. The system 10 may include various actuators responsive to command output signals from the controller 24, each of which also may provide input signals of a monitored condition to controller 24. These actuators include the engine controller 30 for controlling fueling of the engine to provide a desired engine speed and/or engine torque, a clutch actuator 44 for selectively engaging and disengaging master friction clutch 14, a transmission actuator 46 for selectively shifting transmission 16, and a display device 48 for providing information such as engaged gear ratio, system faults and the like, to the vehicle operator Preferably, the system is provided with an input shaft brake 50, also called a clutch brake or an upshift brake, for retarding the speed of the input shaft during upshifts. If an upshift brake is utilized, an upshift brake actuator 52 will be provided, which preferably is responsive to command output signals from controller 24 and also may provide signals indicative of the operational state of the input shaft brake 52 to the controller 24.

Input shaft brakes are of many types, illustrations of which may be seen by reference to U.S. Pat. Nos. 5,452,799 and 5,456,344, the disclosures of which are incorporated herein by reference.

Although a substantially fully automated mechanical transmission system 10 is illustrated, it is understood that the present invention is equally applicable to partially automated transmission systems such as, by way of example, systems in which operation of the master clutch 14 is manual, operation of engine fueling is manual and/or operation of all or a portion of transmission shifting is manual.

The ECU 24 also may be provided with memory means for storing operational information relative to system 10, including information as to elements requiring immediate maintenance attention, which may be accessed by means of a plug 54, by a handheld diagnostic tool or the like.

Preferably, engine 12 will be electronically controlled, including an electronic controller 30 communicating over an electronic data link (DL) operating under an industry standard protocol such as SAE J-1922, SAE J-1939, ISO 11898 or the like. As is known, engine speed, throttle position, engine torque and other parameters may be sent over or read from the data link.

Transmission 16 may be of any known transmission construction, examples of which may be seen by reference to U.S. Pat. Nos. 3,105,395; 3,335,616; 4,754,665 and 5,390,561, the disclosures of which are incorporated herein by reference A typical multiple-speed, combined range-and-splitter-type compound transmission 16 may be seen by reference to FIG. 2. Transmission 16 comprises a main transmission section 112 connected in series with an auxiliary transmission section 114 having both range- and splitter-type gearing As described above, input shaft 20 of transmission 16 is driven by the vehicle engine 12 through the selectively engaged and disengaged master clutch 14. In particular, input shaft 20 is rotatably fixed to the output members or plates 14B of master clutch 14.

In the main transmission section 112 of transmission 16, the input shaft 20 carries an input gear 120 for driving one or more countershaft assemblies 122. Each of the main section countershaft assemblies comprises a main section countershaft 124 supported by bearings in a housing 116 and is provided with main section countershaft gears 130, 132, 134, 136 and 138 fixed thereto. A plurality of main section drive or main shaft gears 140, 142 and 144 surround the transmission main shaft 146 and are selectively clutchable, one at a time, to the main shaft 146 for rotation therewith by sliding clutch collars 148 and 150, as is well known in the prior art. Clutch collars 148 and 150, in the preferred embodiment, are of the well-known, non-synchronized, double-acting jaw clutch type.

Main section main shaft gear 144 is the reverse gear and is continuous meshing engagement with countershaft gears 138 by means of conventional intermediate idler gears (not shown).

Auxiliary transmission section 114 is connected in series with main transmission section 112 and is of the 3-layer, 4-speed combined splitter/range type, as illustrated in aforementioned U.S. Pat. Nos. 4,754,665 and 5,390,561. Main shaft 146 extends into the auxiliary section 114 and is journalled in the inward end of the output shaft 22, which extends from the rearward end of the transmission.

In a preferred embodiment thereof, auxiliary transmission section 114 includes a plurality of substantially identical auxiliary countershaft assemblies (not shown), each comprising an auxiliary countershaft carrying three auxiliary section countershaft gears fixed for rotation therewith. The auxiliary countershaft gears are constantly meshed with and support auxiliary section splitter gear 174, splitter/range gear 176 and range gear 178. A sliding double-sided jaw collar 180 is utilized to selectively couple either the splitter gear 174 or the splitter/range gear 176 to the main shaft 146, while a 2-position synchronized clutch assembly 182 is utilized to selectively couple the splitter/range gear 176 or the range gear 178 to the output shaft 22.

Figure 2:
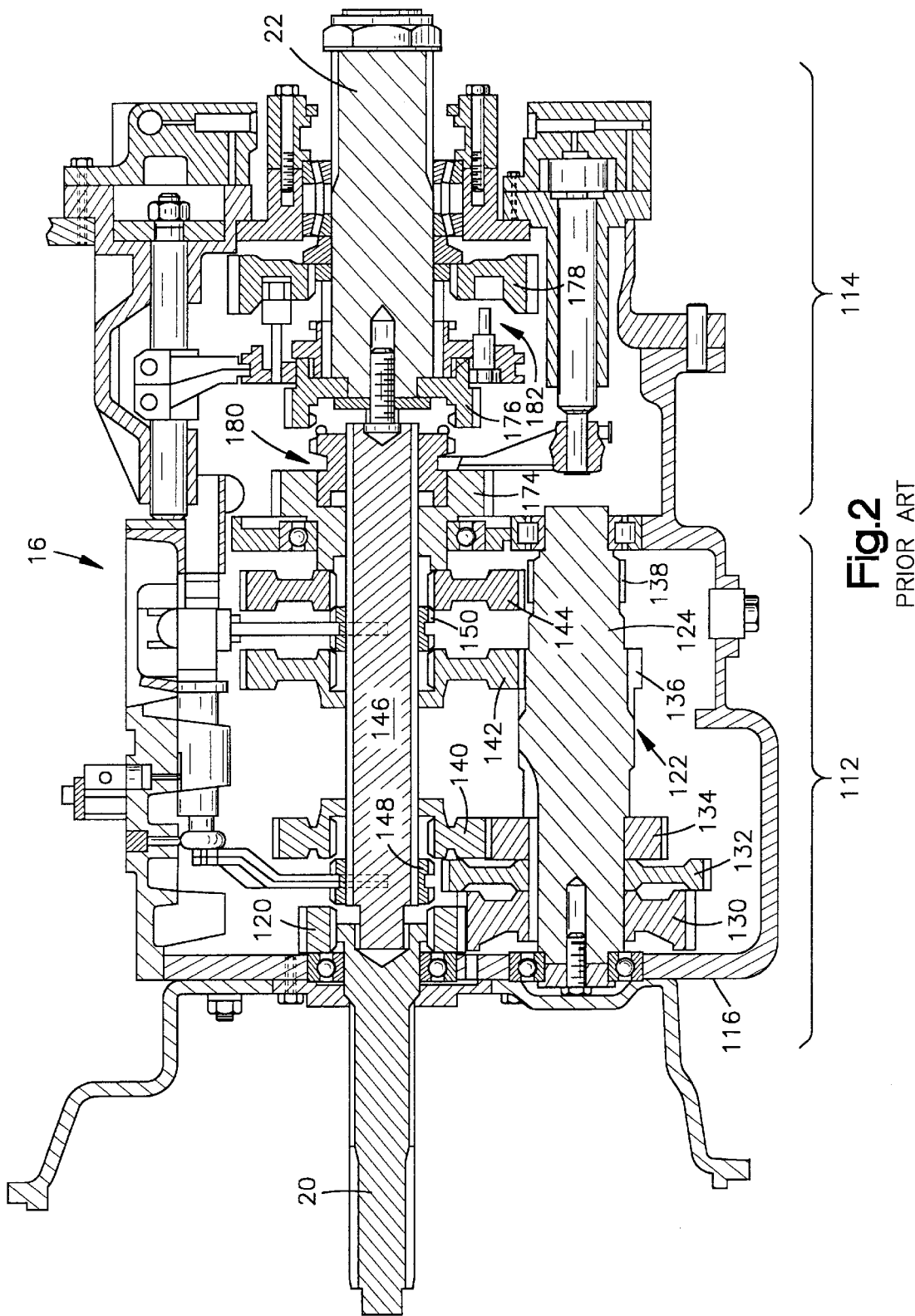
FIG. 2 is a plan view of a combined range-and-splitter-type transmission.
Figure 3A:
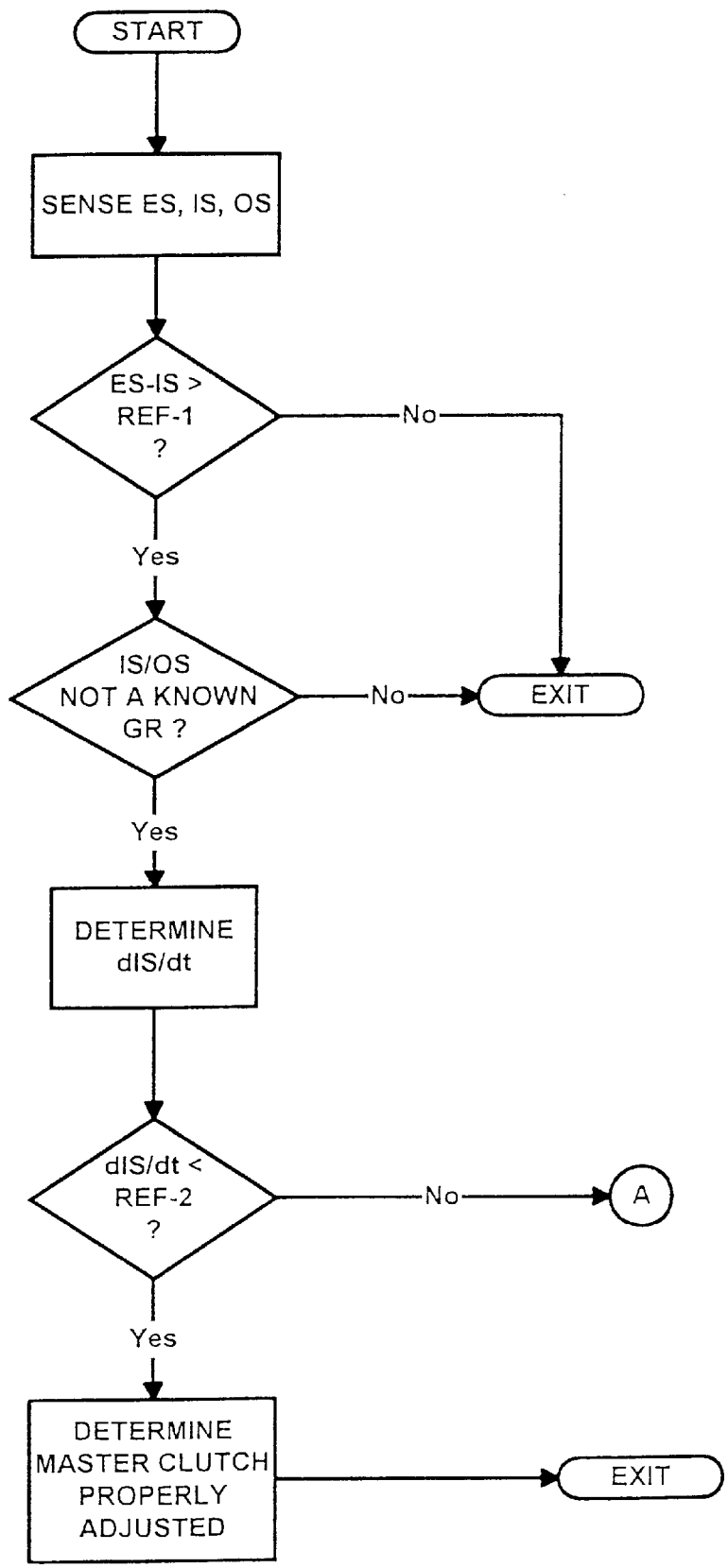
FIGS. 3A and 3B are schematic illustrations, in flow chart format, of the control system/method of the present invention.
Figure 3B:
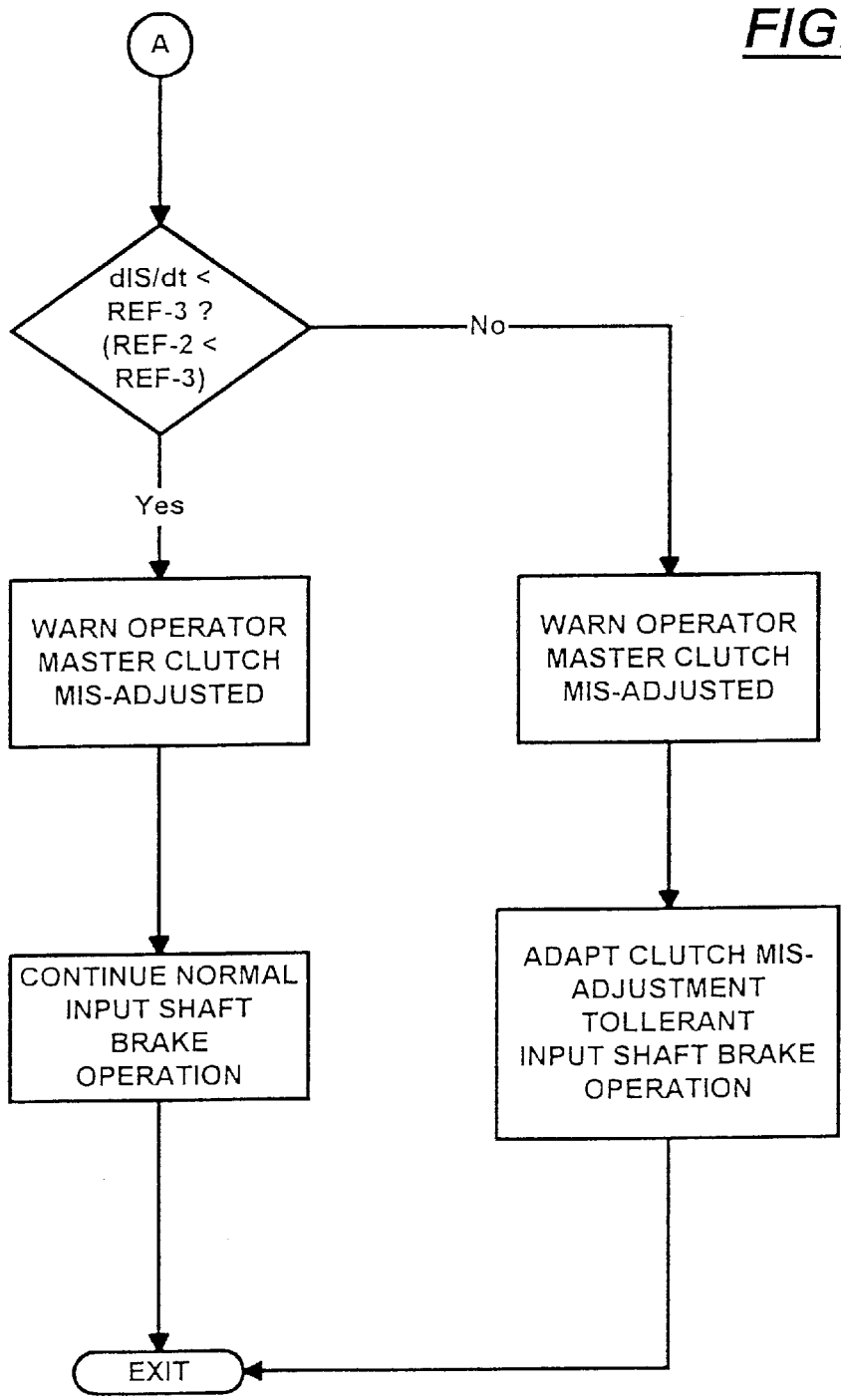

As may be seen by reference to FIG. 2, by selectively axially positioning both the splitter clutch 180 and the range clutch 182 in the forward and rearward axial positions thereof, four distinct ratios of main section rotation to output shaft rotation may be provided. Accordingly, auxiliary transmission section 114 is a 3-layer auxiliary section of the combined splitter-and-range type, providing four selectable speeds or drive ratios between the input (main shaft 146) and the output (output shaft 22) thereof. The main section 112 provides a reverse and three potentially selectable forward speeds. However, one of the selectable main section forward gear ratios, the low speed gear ratios associated with the main shaft gear 142, is not utilized in the high range. Thus, transmission 16 is properly designated as a 10-speed "(2+1)×(2)×(2)" type transmission providing ten selectable forward speeds. While clutch 182, the range clutch, should be a synchronized clutch, the double-acting clutch collar 80, the splitter clutch, is not required to be synchronized.

In transmission systems of the type illustrated, if the master clutch is allowed to become significantly misadjusted, then system performance may deteriorate. By way of example, a misadjusted clutch, even when "disengaged," may have significant residual drag between the input 14A and output 14B friction members such that disengagement of a currently engaged gear ratio to initiate a shift into a different target gear ratio may require excessive force, the time required to achieve synchronous conditions for an upshift may become excessively long, excessive wear of the input shaft brake may occur and/or engagement of a target ratio, especially at start-from-stop conditions, may become difficult or impossible.

According to the present invention, control logic is provided whereby the system controller can sense an existing or impending excessive clutch misadjustment condition and, in response thereto, can notify the operator, take corrective action, create a record that clutch maintenance is required and/or modify system operational logic in a clutch misadjustment tolerant manner.

Applicants have determined that the only time the state of clutch adjustment can be determined with any degree of accuracy is when the clutch and, preferably, the transmission are disengaged. Depending upon the nature of the system, master clutch disengagement can be determined or assumed in a variety of ways. If the system is equipped with engine speed (ES) and input shaft speed (IS) information, master clutch disengagement may be assumed whenever the difference between engine speed and input shaft speed exceeds a predetermined level (the absolute value of ES minus IS is greater than a reference (about 100 RPM)). If the system is provided with a clutch actuator controlled by the system ECU, master clutch disengagement may be assumed whenever the ECU has commanded the clutch actuator to disengage the master clutch. If the system is provided with an input shaft speed sensor 34 but not an engine speed sensor 32, then master clutch disengagement may be surmised whenever the input shaft speed falls below a predetermined value, which value preferably is below the idle speed of the engine. For heavy-duty diesel engines, input shaft speed below 400–500 RPM is considered indicative of master clutch disengagement.

Transmission engaged or disengaged condition may be determined from signals from actuator 46 and/or from a comparison of the ratio of input shaft speed to output shaft speed to known gear ratios (IS/OS=$GR_{1,2\ldots?}$).

Once it has been determined that the master clutch and transmission have been disengaged, the state of master clutch adjustment may be determined based upon the deceleration rate of the input shaft over a predetermined time interval, such as, for example, 0.25 to 1.0 seconds. If the input shaft has a relatively low deceleration rate, i.e., if dIS/dt is greater than a reference, this may be taken as a condition indicative of master clutch misadjustment. Of course, the rate of input shaft deceleration may be compared to various reference values to determine the degree of misadjustment ranging from a properly adjusted clutch, to a clutch requiring maintenance, to a clutch so misadjusted that vehicle operation in a normal manner is not possible.

Upon determining that a clutch is marginally adjusted, a vehicle display 48 may be caused to indicate to the driver that clutch adjustment is required and/or the system memory may be marked that clutch adjustment is required, which information may be derived from a handheld diagnostic tool accessing the controller through plug 54, or by other methods. If the clutch misadjustment is found to be significant, the system may adopt a clutch misadjustment tolerant logic, such as, for example, causing the input shaft brake 50 to be applied in a delayed manner or at a lower input shaft speed to prevent undue wear on the input shaft brake. By way of example, input shaft brake actuation may be prevented until a predetermined time (1–5 seconds) after IS falls below a reference value (about 400–600 RPM).

As an alternative to calculating the derivative dIS/dt, the change in IS over a time period may be taken and compared to reference values. For example, assuming a 0.5-second time period is utilized, a change ($IS_{INITIAL}-IS_{FINAL}$) of at least 150 RPM would be considered indicative of proper clutch adjustment, a change of 75–149 RPM would be considered an indication that adjustment is deteriorating but normal drive train operation is possible, and a change of less than 75 RPM would be considered an indication that the clutch is sufficiently misadjusted so as to require that a clutch-misadjustment-tolerant mode of operation be adopted.

The foregoing clutch adjustment evaluation may be performed every time it is determined that the master clutch and the transmission are disengaged or may be performed on a predetermined schedule.

Although the present invention has been described with a certain degree of particularity, it is understood that the description of the preferred embodiment is by way of example only and that numerous changes to form and detail are possible without departing from the spirit and the scope of the invention as hereinafter claimed.

We claim:

1. A control system for a vehicular automated mechanical transmission system comprising a fuel-controlled engine having an engine output shaft, a mechanical change-gear transmission having an input shaft driven by said engine output shaft through a selectively engaged and disengaged master friction clutch, sensors for providing input signals indicative of system operating conditions, including signals indicative of the rotational speed of said transmission input shaft and of the engaged or disengaged condition of said transmission, and a controller for receiving said input signals and for processing same according to predetermined logic rules to make decisions and to issue command output signals, said control characterized by:

means for determining an engaged or disengaged condition of said master clutch as a function of the value of input shaft speed and a predetermined engagement reference value equal to a less-than-expected idle speed of said engine;

means for determining an engaged or disengaged condition of said transmission;

means for determining a test value indicative of the rate of change with respect to time of the rotational speed of said input shaft;

means effective, upon determining master clutch and transmission disengaged conditions, to compare said test value to one or more predetermined first reference values to determine the state of adjustment of said master clutch; and means effective, upon determining the existence of an unsatisfactory state of adjustment of said master clutch, to initiate predetermined corrective action.

2. The control of claim 1 wherein said automated mechanical transmission system includes an input shaft brake and said input shaft brake is operated as a function of the determined state of adjustment of said master clutch.

3. The control of claim 2 wherein said corrective action comprises preventing actuation of said input shaft brake until sensed input shaft speed is less than a predetermined third reference value.

4. The control of claim 1 wherein said automated mechanical transmission system includes an operator display device and said corrective action comprises notifying a vehicle operator of said master clutch misadjustment condition.

5. The control of claim 1 wherein said automated transmission control unit controller includes a memory means for storing information relative to the operation of said system and said corrective action includes storing in said memory information relative to the determined state of misadjustment of said master clutch.

6. A machine (24) for controlling a vehicular automated mechanical transmission system comprising a fuel-controlled engine (10) having an engine output shaft (18), a mechanical change-gear transmission (16) having an input shaft (20) driven by said engine through a selectively engaged and disengaged masters friction clutch (14), an input shaft brake (50), and sensors (32, 34, 36, 40, 42) for providing input signals (26) indicative of system operating conditions, said machine comprising:

(1) input signal receiving means for receiving said input signals, including input signals (IS) indicative of input shaft rotational speed and of the engaged ratio or neutral condition of said transmission (GR); and (2) data processing means for processing said input signals according to predetermined logic rules to make decisions and to issue command output signals (28) to system actuators (46, 48), said data processing means including logic rules for:

(a) determining an engaged or disengaged condition of said master clutch;

(b) determining an engaged or neutral condition state of said transmission;

(c) determining a test value indicative of rate of change with respect to time of said input signal indicative of the rotational speed of said transmission input shaft;

(d) upon determining master clutch and transmission disengaged conditions, comparing said test value to a predetermined first reference value to determine the state of adjustment of said master clutch; and if said test value exceeds said predetermined reference value, determining said clutch to be in a state of misadjustment;

(e) operating said input shaft brake as a function of the determined state of adjustment of said master clutch; and (f) upon determining said master clutch to be in a state of misadjustment, taking corrective action.

7. The machine of claim 6 wherein said input signals further include a signal indicative of engine rotational speed and said determination of the engaged or disengaged state of said master clutch is performed as a function of the difference between said engine speed and said input shaft speed.

8. The machine of claim 6 wherein said transmission system includes a master clutch actuation member and said input signals include a signal indicative of the position of said master clutch actuator, said determination of the engaged or disengaged condition of said master clutch is performed as a function of said signal indicative of the position of said actuator.

9. The machine of claim 6 wherein said corrective action comprises preventing actuation of said input shaft brake until sensed input shaft speed is less than a predetermined third reference value.

10. The machine of claim 6 wherein said automated mechanical transmission system includes an operator display device and said corrrective action comprises notifying a vehicle operator of said master clutch misadjustment condition.

11. The machine of claim 6 further comprising a memory means for storing information relative to the operation of said system and said corrective action includes storing in said memory information relative to the determined state of misadjustment of said master clutch.

12. The machine of claim 6 wherein said for determination of the engaged or disengaged condition of said master clutch is performed as a function of the value of input shaft speed and a predetermined second reference value.

13. The machine of claim 12 wherein said predetermined second reference value is less than the expected idle speed of said engine.

14. A control method for a vehicular automated mechanical transmission system comprising a fuel-controlled engine having an engine output shaft, a mechanical change-gear transmission having an input shaft driven by said engine output shaft through a selectively engaged and disengaged master friction clutch, sensors for providing input signals indicative of system operating conditions, including signals indicative of the rotational speed of said transmission input shaft and of the engaged or disengaged condition of said transmission, and a controller for receiving said input signals and for processing same according to predetermined logic rules to make decisions and to issue command output signals, said controller having memory means for storing information relative to operation of said system, said method characterized by:

determining an engaged or disengaged condition of said master clutch;

determining an engaged or disengaged condition of said transmission;

determining a test value indicative of the rate of change with respect to time of the rotational speed of said input shaft;

upon determining master clutch and transmission disengaged conditions, comparing said test value to one or more predetermined first reference values to determine the state of adjustment of said master clutch; and if said test value exceeds said one or more reference values, determining said master clutch to be in an unsatisfactory state of adjustment; and upon determining the existence of an unsatisfactory state of adjustment of said master clutch, initiating predetermined corrective action, including storing in said memory information relative to the determined state of adjustment of said master clutch.

15. The method of claim 14 wherein said input signals further include a signal indicative of engine rotational speed and said determining the engaged or disengaged condition of said master clutch involves determination as a function of the difference between said engine speed and said input shaft speed.

16. The method of claim 14 wherein said transmission system includes a master clutch actuation member and said input signals include a signal indicative of the position of said master clutch actuator, said determining the engaged or disengaged condition of said master clutch involving determination as a function of said signal indicative of the position of said actuator.

17. The method of claim 14 wherein said determining the engaged or disengaged condition of said master clutch involves determination as a function of the value of input shaft speed and a predetermined second reference value.

18. The method of claim 17 wherein said predetermined second reference value is less than the expected idle speed of said engine.

19. The method of claim 14 wherein said automated mechanical transmission system includes an operator display device and said corrective action comprises notifying a vehicle operator of said master clutch misadjustment condition.

20. A control method for a vehicular automated mechanical transmission system comprising a fuel-controlled engine having an engine output shaft, a mechanical change-gear transmission having an input shaft driven by said engine output shaft through a selectively engaged and disengaged master friction clutch, an input shaft brake, sensors for providing input signals indicative of system operating conditions, including signals indicative of the rotational speed of said transmission input shaft and of the engaged or disengaged condition of said transmission, and a controller for receiving said input signals and for processing same according to predetermined logic rules to make decisions and to issue command output signals, said method characterized by:

determining an engaged or disengaged condition of said master clutch;

determining an engaged or disengaged condition of said transmission;

determining a test value indicative of the rate of change with respect to time of the rotational speed of said input shaft;

upon determining master clutch and transmission disengaged conditions, comparing said test value to one or more predetermined first reference values to determine the state of adjustment of said master clutch; and if said test value exceeds said one or more reference values, determining said master clutch to be in an unsatisfactory state of adjustment;

operating said input shaft brake as a function of the determined state of adjustment of said master clutch; and upon determining the existence of an unsatisfactory state of adjustment of said master clutch, initiating predetermined corrective action.

21. The method of claim 20 wherein said corrective action comprises preventing actuation of said input shaft brake until sensed input shaft speed is less than a predetermined third reference value.

* * * * *